United States Patent [19]

Yamato et al.

[11] 4,444,173

[45] Apr. 24, 1984

[54] ELECTRONIC FUEL INJECTION CONTROL SYSTEM FOR USE WITH AN INTERNAL COMBUSTION ENGINE, HAVING AN AFTER-START FUEL INCREASING FUNCTION

[75] Inventors: Akihiro Yamato, Sayama; Shigeo Umesaki, Saitama, both of Japan

[73] Assignee: Honda Motor Co., Ltd., Tokyo, Japan

[21] Appl. No.: 385,517

[22] Filed: Jun. 7, 1982

[30] Foreign Application Priority Data

Jun. 11, 1981 [JP] Japan .................................. 56-89931

[51] Int. Cl.³ .............................................. F02B 3/00
[52] U.S. Cl. ..................................... 123/491; 123/478
[58] Field of Search .................. 123/491, 478, 179 G, 123/179 A, 179 B

[56] References Cited

U.S. PATENT DOCUMENTS

| | | | |
|---|---|---|---|
| 4,239,022 | 12/1980 | Drews et al. ....................... | 123/491 |
| 4,245,317 | 1/1981 | Marchak ............................. | 123/491 |
| 4,274,381 | 6/1981 | Abo ..................................... | 123/491 |
| 4,357,922 | 11/1982 | Rosenzopf et al. ................. | 123/491 |

FOREIGN PATENT DOCUMENTS

| | | | |
|---|---|---|---|
| 1576283 | 3/1970 | Fed. Rep. of Germany ...... | 123/491 |
| 2243680 | 3/1973 | Fed. Rep. of Germany ...... | 123/491 |
| 2652733 | 6/1977 | Fed. Rep. of Germany ...... | 123/491 |

*Primary Examiner*—Raymond A. Nelli
*Attorney, Agent, or Firm*—Arthur L. Lessler

[57] ABSTRACT

An electronic fuel injection control system for use with an internal combustion engine is adapted to determine an initial value of fuel increment as a function of the engine temperature at the termination of a starting condition of the engine where the starting switch of the engine is closed and the engine rpm is smaller than a predetermined rpm, e.g. the cranking rpm of the engine, and then gradually decrease the determined initial fuel incremental value in synchronism with generation of a pulse signal which is synchronous with the rotation of the engine.

4 Claims, 12 Drawing Figures

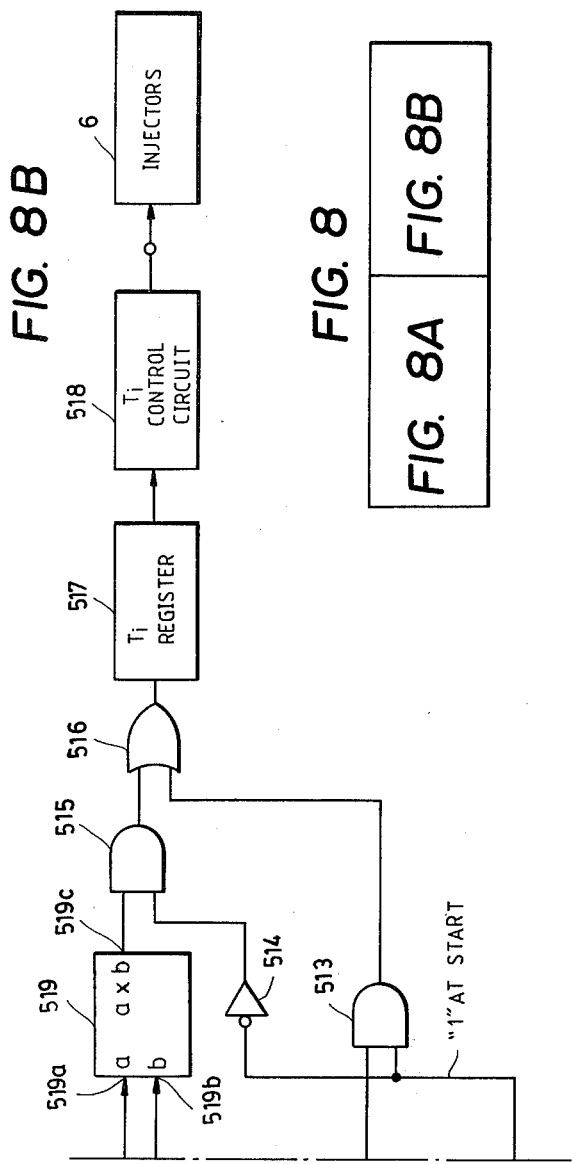
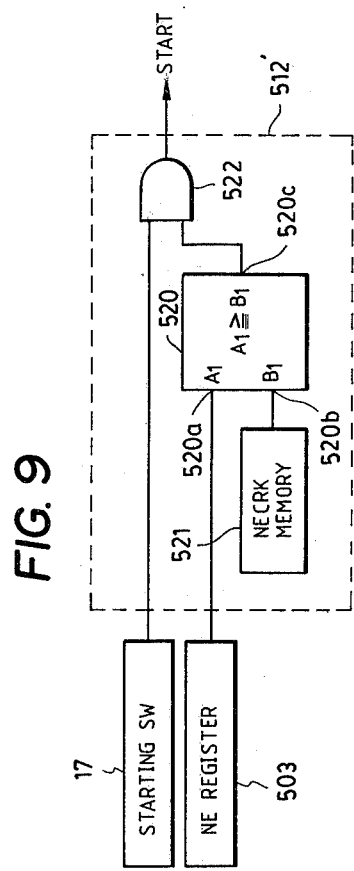

ELECTRONIC FUEL INJECTION CONTROL SYSTEM FOR USE WITH AN INTERNAL COMBUSTION ENGINE, HAVING AN AFTER-START FUEL INCREASING FUNCTION

BACKGROUND OF THE INVENTION

This invention relates to an electronic fuel injection control system for internal combustion engines, and more particularly to an electronic fuel injection control system of this kind which is adapted to increase the quantity of fuel being supplied to an internal combustion engine after the start of the engine, so as to obtain stable operation and enhanced driveability of the engine.

A fuel supply control system adapted for use with an internal combustion engine, particularly a gasoline engine has been proposed e.g. by U.S. Pat. No. 3,483,851, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

On the other hand, it is generally employed to increase the quantity of fuel being supplied to the engine after the start of the engine, to prevent engine stall after the start of the engine.

However, in carrying out this after-start fuel increase by the use of the above-mentioned proposed fuel supply control system having the electronic computing means, there is the following problem: An electronic control unit (hereinafter called "ECU") containing a central processing unit (hereinafter called "CPU") is generally used as the above electronic computing means. Usually, the ECU is supplied with operating voltage from a battery installed in the automotive vehicle on which the engine is installed, which battery is also used as a power source for other electric parts of the automotive vehicle. The starting motor of the engine which forms one of the electric parts of the automotive vehicle is connected to the above battery by way of a starting switch. The starting switch is closed for a period of time from the start of the engine until after the engine has reached its complete firing state, to connect the battery to the starting motor for actuating same, and after the lapse of the above period of time, the starting switch is opened. Then, the starting motor is supplied with electric power from a charging generator whose output voltage has already been elevated by that time. However, at an instant when the starting switch is closed to actuate the starting motor at the start of the engine, there can usually occur a temporary drop in the output voltage of the battery due to its sudden feeding to the starting motor. The degree of the battery voltage drop becomes larger as the ambient temperature drops. Accordingly, in very cold weather, there occurs a corresponding temporary drop in the supply voltage of the ECU which is also fed by the same battery so that the output voltage of a voltage regulator circuit provided in the ECU, which is fed to various parts of the ECU drops below a rated voltage. Further, various sensors for sensing various operating condition parameters of the engine also undergo a drop in their supply voltage so that their analog output voltages cannot represent accurate parameter values. In addition, an A/D converter provided in the ECU for converting analog voltages outputted from the sensors into digital signals fails to function properly so that its output digital values are inaccurate. The CPU is supplied with these inaccurate digital values and also undergoes a drop in the supply voltage applied to itself below its minimum proper operating voltage, resulting in an improper arithmetic operation. As known, the after-start fuel incremental value is determined as a function of the temperature of the engine such as the temperature of engine cooling water. The engine cooling water temperature is sensed by a water temperature sensor composed of a thermistor or the like. If a digital value indicative of the sensed water temperature value, which is outputted from the A/D converter, is not accurate, the after-start fuel incremental value, which is arithmetically calculated by the CPU on the basis of the above digital value, is not correct, resulting in degraded driveability of the engine after the start of the engine.

OBJECTS AND SUMMARY OF THE INVENTION

It is an object of the invention to provide an electronic fuel injection control system for use with an internal combustion engine, which is capable of increasing the quantity of fuel being supplied to the engine after the start of the engine, to a proper value dependent upon the engine temperature, thereby preventing engine stall after the start of the engine.

It is another object of the invention to provide an electronic fuel injection control system for use with an internal combustion engine, which is adapted to detect a moment when the supply voltage for the ECU can never drop below the rated value after the start of the engine and at this detected moment, carry out an arithmetic calculation of the after-start fuel incremental value to thereby obtain accurate after-start fuel increment.

An electronic fuel injection control system according to the present invention is intended for electronically controlling the quantity of fuel being supplied to an internal combustion engine which is equipped with a starter, a starting switch and a direct current voltage power source which can be formed of a battery, connected to the starter by way of the starting switch. The fuel injection control system includes: a first sensor for sensing the rotational speed of the engine; a second sensor for sensing the temperature of the engine; means for generating a pulse signal in synchronism with rotation of the engine; means adapted to generate a signal indicative of the engine being in a starting state, when the starting switch is in its closed position and the engine rotational speed sensed by the first sensor is smaller than a predetermined value; means adapted to increase the quantity of fuel being supplied to the engine upon and after termination of generation of the above start-indicative signal. The above fuel increasing means is adapted to determine an initial value of after-start fuel increment as a function of an engine temperature value sensed by the second sensor, and gradually decrease the initial value thus determined in synchronism with generation of the above pulse signal. At least the fuel increasing means is arranged to be supplied with operating voltage from the above direct current voltage power source of the engine. Further, the fuel increasing means is arranged to arithmetically calculate the above initial fuel incremental value as a function of an engine temperature value sensed by the second sensor solely one time immediately upon the termination of generation of the start signal.

The above and other objects, features and advantages of the invention will be more apparent from the ensuing detailed description taken in connection with the accompanying drawings in which:

BRIEF DESCRIPTION OF THE DRAWINGS

FIGS. 8a and 8b is a circuit diagram illustrating the whole arrangement of the ECU including a circuit for determining the engine start and calculating the after-start fuel increment;

FIG. 9 is a circuit diagram illustrating in detail the engine start determining section of the engine start determining/after-start fuel increment calculating circuit in FIG. 8.

DETAILED DESCRIPTION

The present invention will now be described in detail with reference to the drawings showing an embodiment of the invention.

Figure 1:
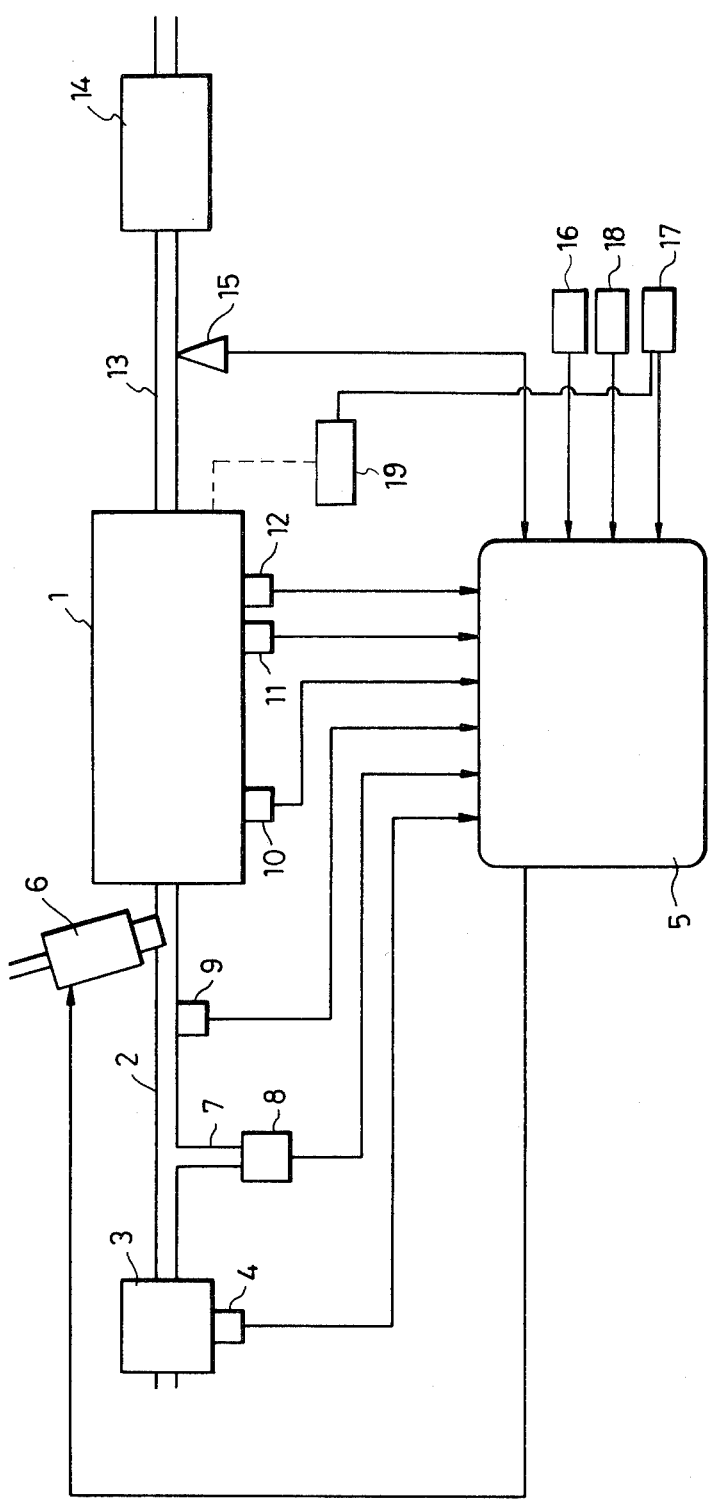
FIG. 1 is a block diagram of the whole internal arrangement of an electronic fuel injection control system according to the present invention.

Referring first to FIG. 1, there is illustrated the whole arrangement of a fuel injection control system for internal combustion engines, according to the present invention. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an ECU 5.

A fuel injection device 6 is arranged in the intake pipe 2 at a location between the engine 1 and the throttle body 3, which comprises main injectors and a subinjector, none of which is shown. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods or fuel injection quantities controlled by signals supplied from the ECU 5.

On the other hand, an absolute pressure sensor 8 communicates through a conduit 7 with the interior of the main intake pipe of the throttle body 3 at a location immediately downstream of the main throttle valve. The absolute pressure sensor 8 is adapted to detect absolute pressure in the intake pipe 2 and applies an electrical signal indicative of detected absolute pressure to the ECU 5. An intake-air temperature sensor 9 is arranged in the intake pipe 2 at a location downstream of the absolute pressure sensor 8 and also electrically connected to the ECU 5 for supplying thereto an electrical signal indicative of detected intake-air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starting switch 17, and a battery 18, respectively, for supplying an electrical signal indicative of detected atmospheric pressure, an electrical signal indicative of its own on and off positions and a supply voltage to the ECU 5. The starting switch 17 is connected to the starting motor 19 of the engine 1 and also to the battery 18. The switch 17 is closed at the start of the engine 1 to cause the output voltage of the battery 18 to be fed to the starting motor 19 to actuate the latter.

Next, the fuel quantity control operation of the fuel injection control system of the invention outlined as above will now be described in detail with reference to FIG. 1 referred to hereinabove and FIGS. 2 through 10.

Figure 2:
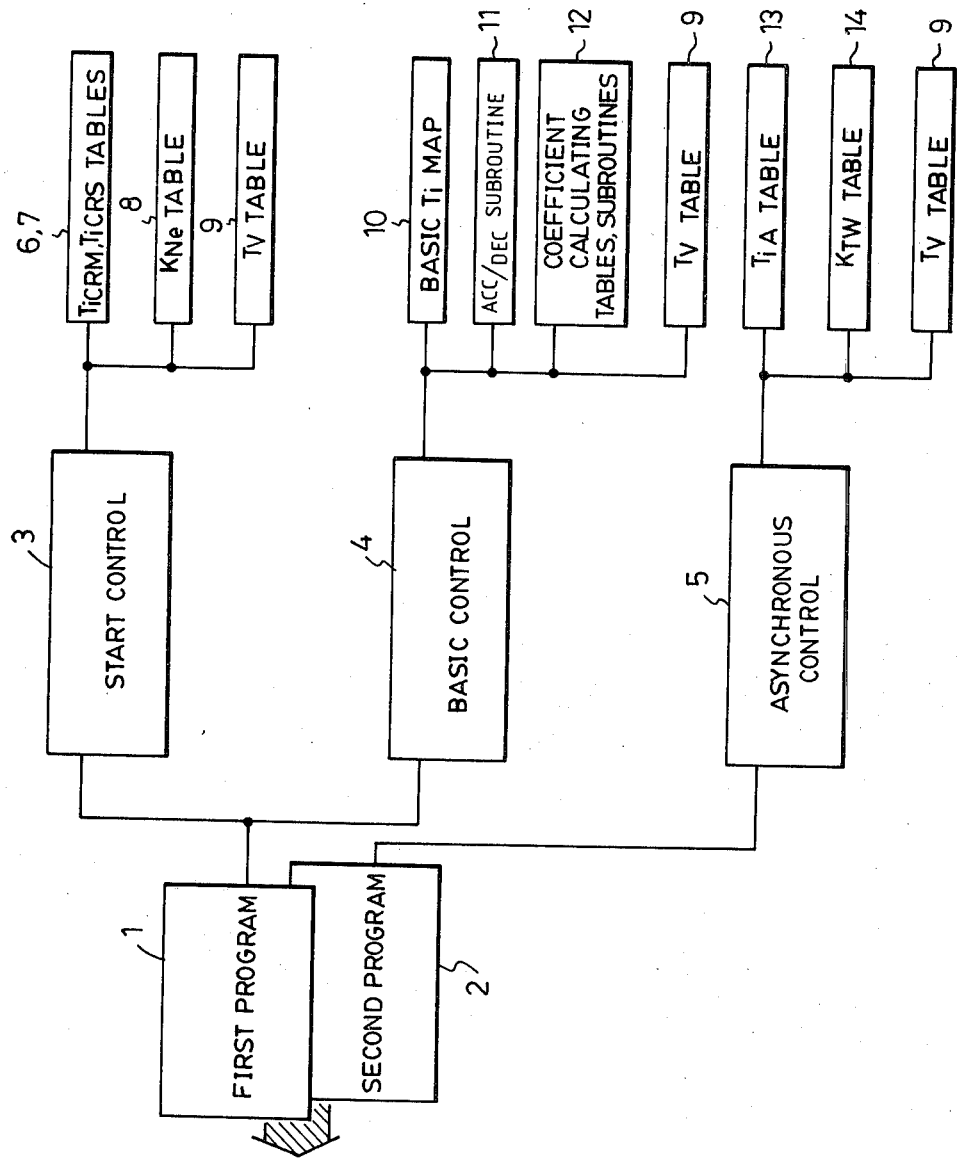
FIG. 2 is a block diagram illustrating a whole program for control of the valve opening periods TOUTM and TOUTS of the main injectors and the subinjector, which is incorporated in the electronic control unit (ECU) in FIG. 1.

Referring first to FIG. 2, there is illustrated a block diagram showing the whole program for air/fuel ratio control, i.e. control of the valve opening periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery 18, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times KAST \times KWOT \times KO_2 \times KLS) + TACC \times (KTA \times KTWT \times KAFC \times KPA \times KAST) + (TV + \Delta TV) \quad (3)$$

$$TOUTS = (TiS - TDEC) \times (KTA \times KTW \times KAST \times KPA) + TV \quad (4)$$

where TiM and TiS represent basic values of the valve opening periods for the main injectors and the subinjector, respectively, and are determined from a basic Ti map 10, and TDEC and TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, KO$_2$ an "O$_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture. TACC is a fuel increasing constant applicable at engine acceleration and determined by a subroutine and from a table.

On the other hand, the valve opening period TMA for the main injectors which is applicable in asynchronism with the TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 3:
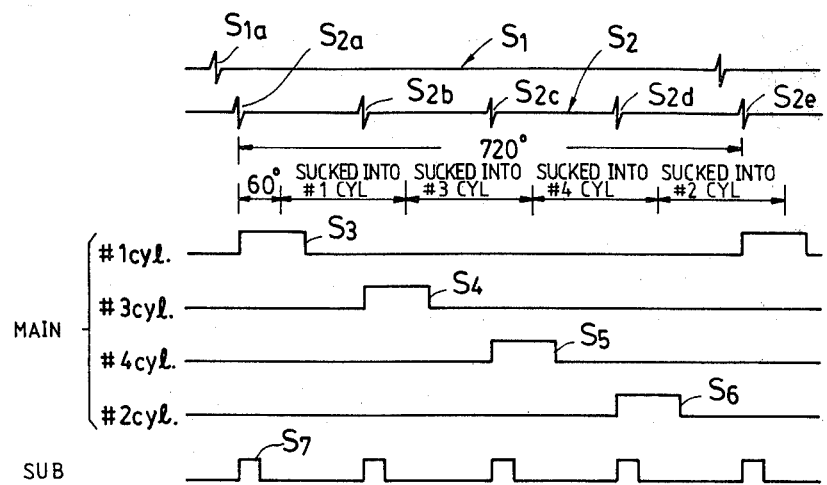
FIG. 3 is a timing chart showing the relationship between a cylinder-discriminating signal and a TDC signal inputted to the ECU, and drive signals for the main injectors and the subinjector, outputted from the ECU.

FIG. 3 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_{1a}$ each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse $S_{2b}$, the driving signal $S_5$ for the fourth cylinder concurrently with the third pulse $S_{2c}$, and the driving signal $S_6$ for the second cylinder concurrently with the fourth pulse $S_{2d}$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_{2a}$, $S_{2b}$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figure 4:
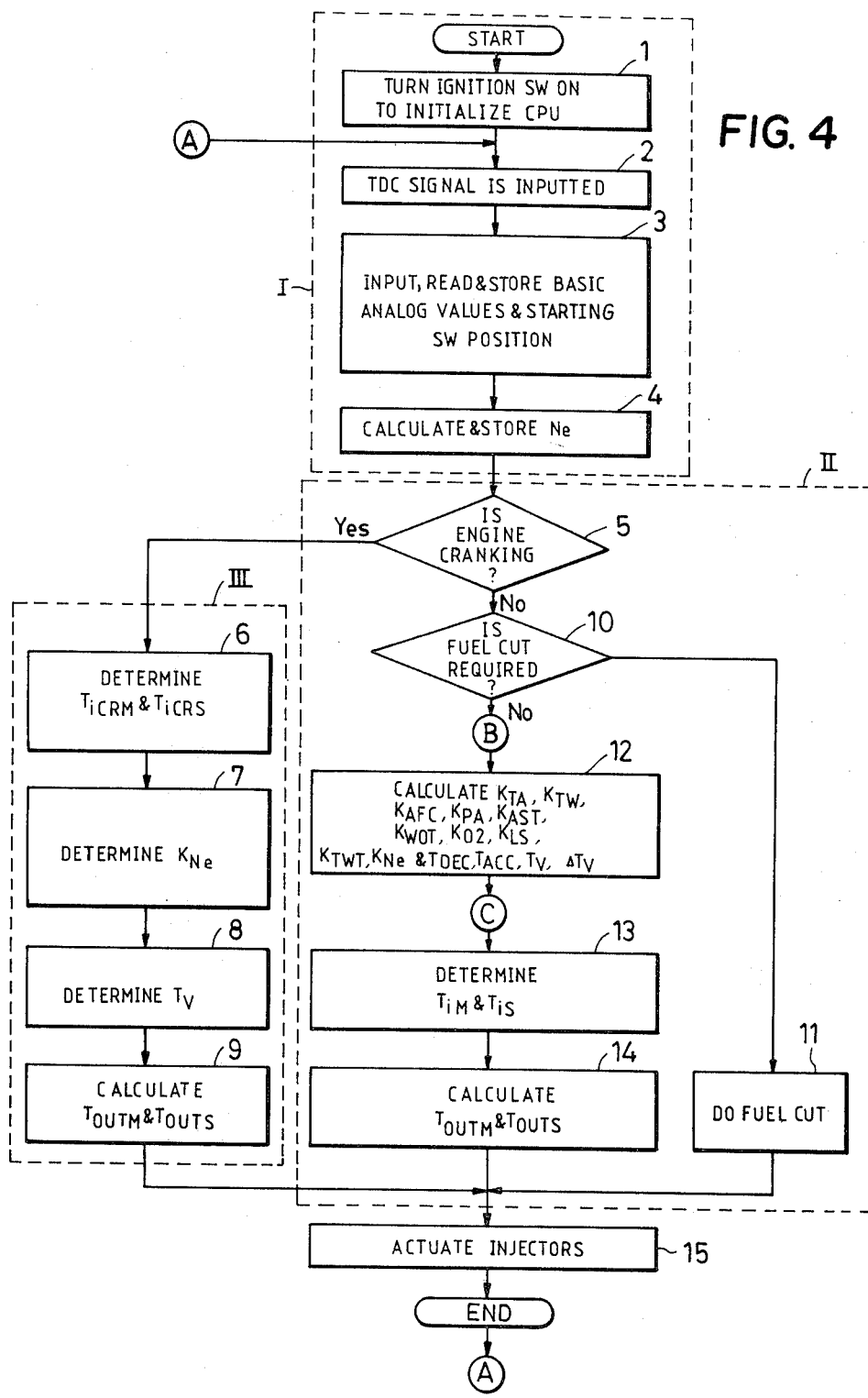
FIG. 4 is a flow chart showing a main program for control of the valve opening periods TOUTM and TOUTS.

Referring next to FIG. 4, there is shown a flow chart of the aforementioned first program 1 for control of the valve opening period in synchronism with the TDC signal in the ECU 5. The whole program comprises an input signal processing block I, a basic control block II and a start control block III. First in the input signal processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, absolute pressure PB, engine cooling water temperature TW, atmospheric air temperature TA, throttle valve opening $\theta$th, battery voltage V, output voltage value V of the $O_2$ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM and TOUTS (step 9).

If the answer to the question of the above step 5 is no, it is determined whether or not the engine is in a condition for carrying out fuel cut, at the step 10. If the answer is yes, the values of TOUTM and TOUTS are both set to zero, at the step 11.

On the other hand, if the answer to the question of the step 10 is negative, calculations are carried out of values of correction coefficients KTA, KTW, KAFC, KPA, KAST, KWOT, $KO_2$, KLS, KTWT, etc. and values of correction constants TDEC, TACC, TV, and $\Delta$TV, by means of the respective calculation subroutines and tables, at the step 12.

Then, basic valve opening period values TiM and TiS are selected from respective maps of the TiM value and the TiS value, which correspond to data of actual engine rpm Ne and actual absolute pressure PB and/or like parameters, at the step 13.

Then, calculations are carried out of the values TOUTM and TOUTS on the basis of the values of correction coefficients, correction constants and basic valve opening periods determined at the steps 12 and 13, as described above, using the aforementioned equations (3), (4) (the step 14). The main injectors and the subinjector are actuated with valve opening periods corresponding to the values of TOUTM and TOUTS obtained by the aforementioned steps 9, 11 and 14 (the step 15).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

Figure 5:
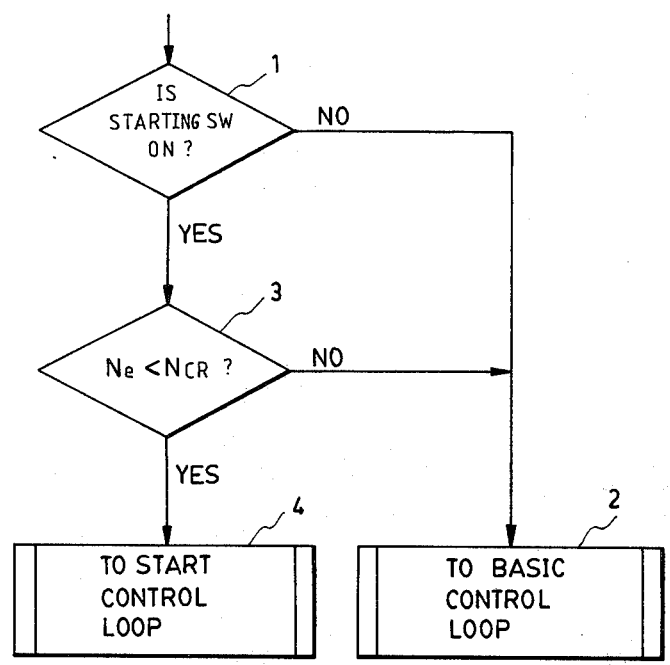
FIG. 5 is a flow chart showing an engine cranking determining subroutine forming part of the main program of FIG. 4.

Description will now be made about an engine start determining subroutine and an after-start fuel increasing coefficient KAST calculating subroutine. FIG. 5 is a flow chart showing the subroutine of the step 5 in FIG. 4 for determining whether or not the engine is in a cranking state. First, a determination is made as to whether or not the starting switch is on or closed, at the step 1. If the switch is off, the engine is of course not regarded as being in a cranking state and the program proceeds to the basic control loop at the step 2, while if the switch is on, it is determined whether or not the engine rpm Ne is lower than a predetermined cranking rpm NCR (eg. 400 rpm), at the step 3. If the former is larger than the latter, the CPU regards the engine as not being cranked and the program proceeds to the basic control loop. If the former is smaller than the latter, the CPU judges the engine is in a cranking state to have the program proceed to the start control loop (the block III in FIG. 4), at the step 4.

Figure 6:
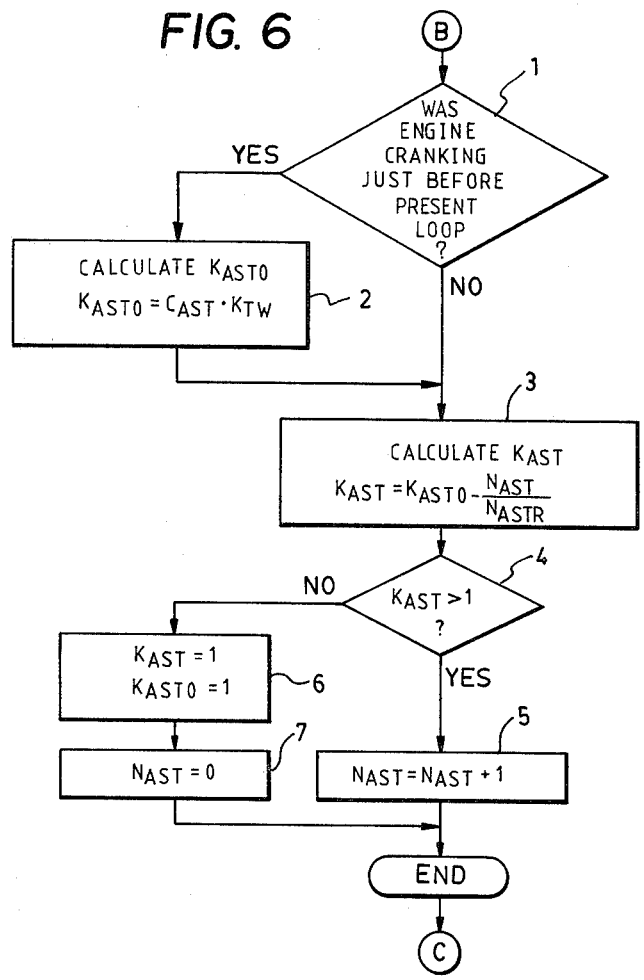
FIG. 6 is a flow chart showing a subroutine for calculating the value of after-start fuel increasing coefficient KAST.
Figure 7:
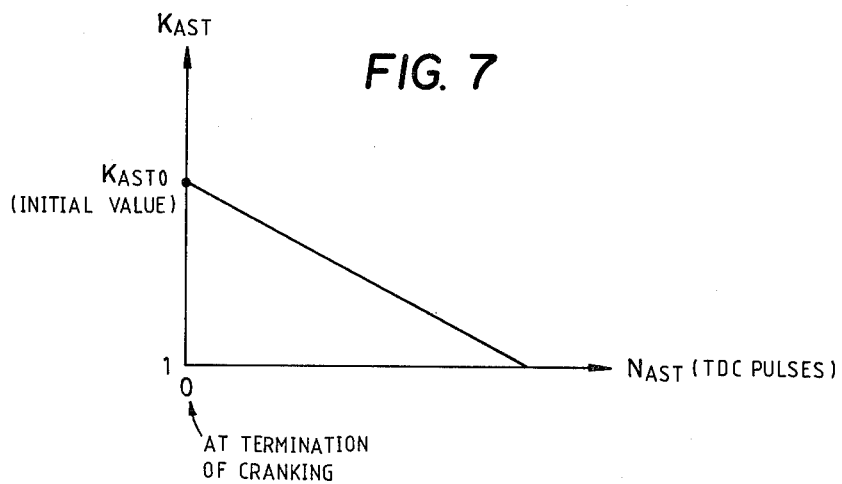
FIG. 7 is a graph showing the relationship between the after-start fuel increasing coefficient KAST and a TDC pulse signal NAST.

When it has been judged at the step 5 in FIG. 4 that the cranking or starting operation has finished, an increased amount of fuel should be supplied to the engine for a suitable period of time. FIG. 6 shows a flow chart of the subroutine for calculating the value of the fuel increasing coefficient KAST applicable after the start of the engine. A determination is first made as to whether or not the engine was in a cranking state just before the present loop, at the step 1. If it has been determined that the engine was cranking, the initial value KAST0 of the after-start fuel increasing coefficient KAST is calculated from the following equation, at the step 2:

$$KAST0 = CAST \times KTW \qquad (6)$$

where CAST is defined as a calibration variable, and KTW as the water temperature-dependent fuel increasing coefficient, respectively. The value of the coefficient KTW is determined from a table as a function of actual engine cooling water temperature TW. Then, based upon the initial value KAST0 thus obtained, the value of the fuel increasing coefficient KAST is calcualted from the following equation, at the step 3:

$$KAST = KAST0 - NAST/NASTR \qquad (7)$$

where 1/NASTR means an attenuation constant, and NAST the number of TDC signal pulses counted after the start of the engine, i.e., after termination of the cranking state of the engine, respectively. It is then determined whether or not the value of coefficient KAST has become smaller than 1, at the step 4. If the answer is no, counting is made of the TDC signal pulse number NAST at the step 5 to continue the calculation of the value of coefficient KAST by means of the equation (7). When the value of coefficient KAST decreases to or below 1, the counting of the TDC signal pulse number NAST is interrupted and the KAST value is set to 1 at the step 6. At the same time, the TDC signal pulse number NAST so far counted is resetted to zero at the step 7. FIG. 7 shows the relationship between the fuel increasing coefficient KAST and the TDC signal pulse number NAST, both appearing in FIG. 6. The value of the fuel increasing coefficient KAST is decreased from its initial value KAST0 by the attenuation constant 1/NASTR each time the pulse number NAST increases by 1. After the coefficient KAST has been decreased to or below 1, it is held at 1, and simultaneously the after-start fuel increasing operation is terminated.

Figure 8A:
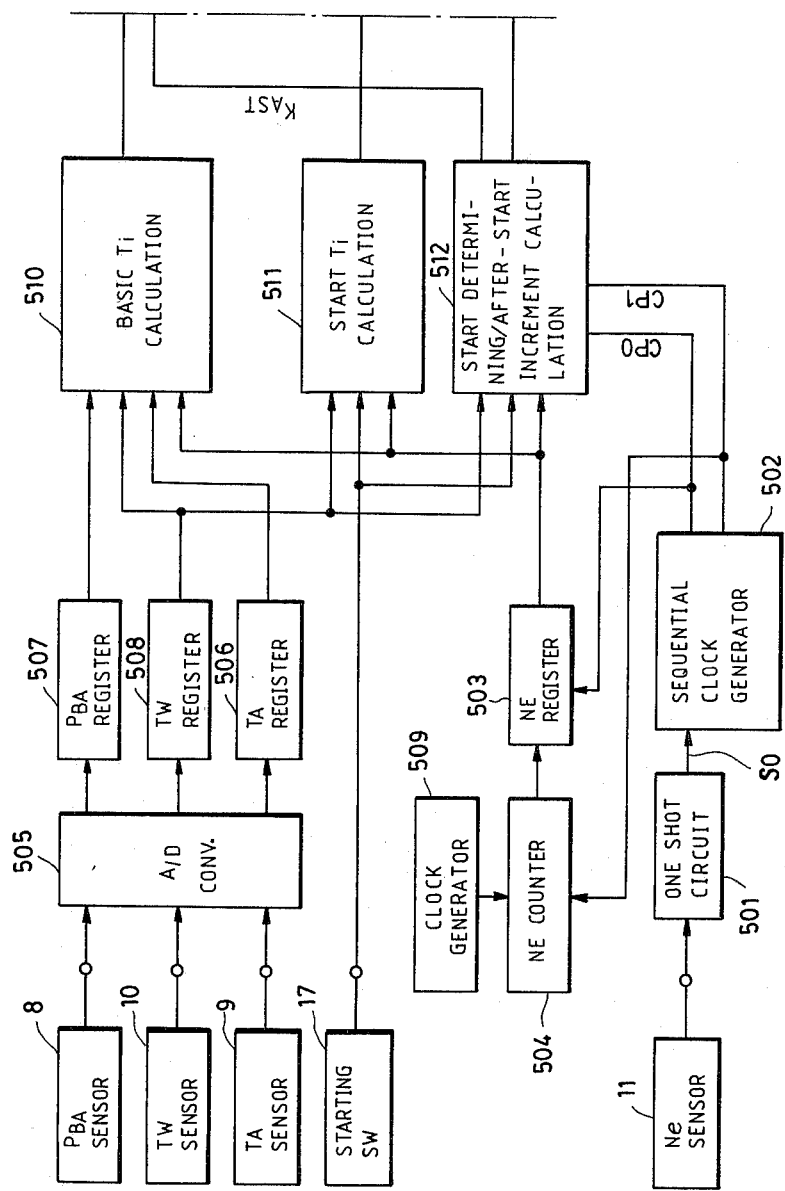
Figure 10:
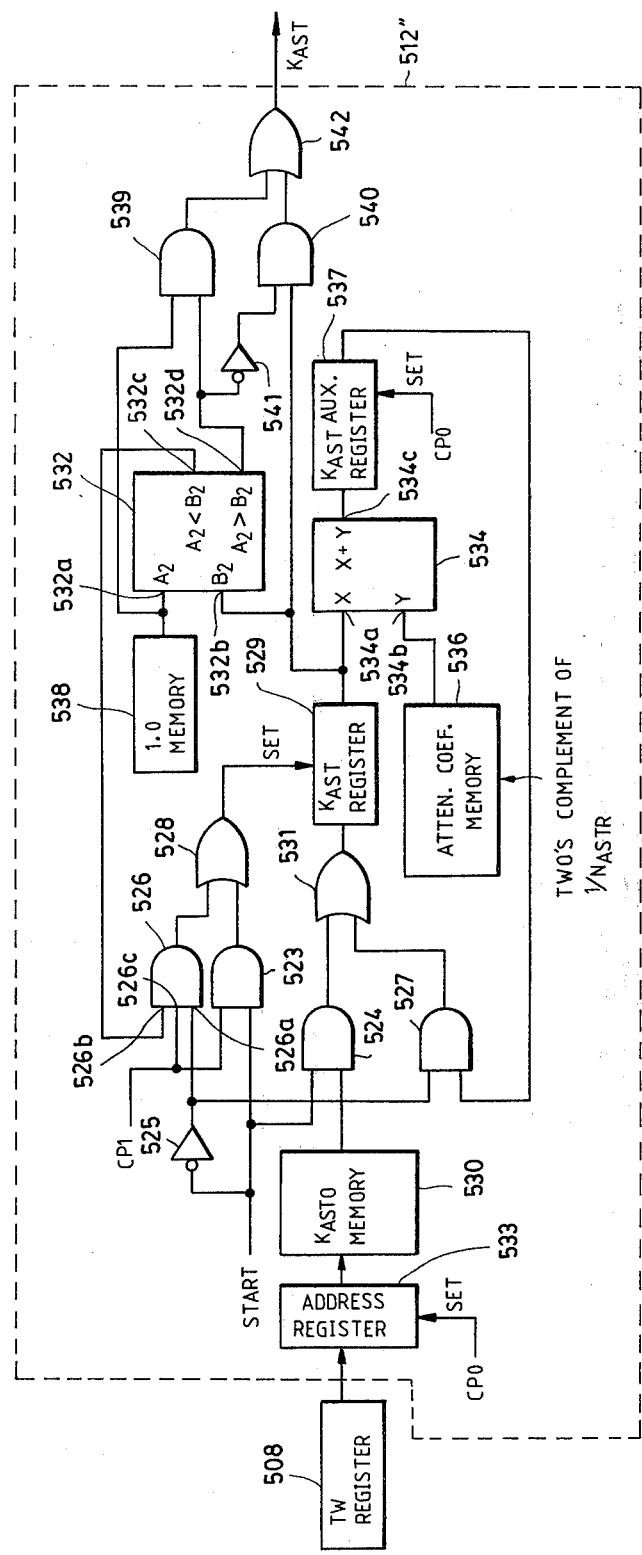
FIG. 10 is a circuit diagram illustrating in detail the after-start fuel increment calculating section of the engine start determining/after-start fuel increment calculating circuit in FIG. 8.

FIGS. 8 through 10 illustrate the internal arrangement of the ECU 5 forming an essential part of the electronic fuel injection control system of the invention, in which is shown in particular detail the start determining/after-start fuel increasing section.

Referring first to FIG. 8, there is shown the whole internal arrangement of the ECU 5 containing the start determining/after-start fuel increasing section. The TDC signal generated by the engine rpm sensor 11 in FIG. 1 is supplied to a one shot circuit 501 which forms a waveform shaper circuit in cooperation with a sequential clock generator 502 arranged postadjacent thereto. The one shot circuit 501 generates a pulse signal So each time one pulse of the TDC signal is applied thereto, which signal actuates the sequential clock generator 502 to sequentially generate clock pulses CP0 and CP1. The clock pulse CP0 is applied to an engine rpm NE value register 503 to cause same to store an immediately preceding count outputted from an engine rpm counter 504 which counts reference clock pulses generated by a reference clock generator 509. Then, the clock pulse CP1 is applied to the engine rpm counter 504 to reset the immediately preceding count in the counter 504 to zero. Therefore, the engine rpm Ne is measured in the form of the number of reference clock pulses counted between two adjacent pulses of the TDC signal. The counted reference clock pulse number or measured engine rpm NE is loaded into the above NE value register 503. The clock pulses CP0 and CP1 are also supplied to the after-start fuel increasing coefficient calculating circuit of FIG. 10, hereinlater described.

In a manner parallel with the above operation, output signals of the intake air temperature TA sensor 9, the absolute pressure PBA sensor 8 and the engine cooling water temperature TW sensor 10 are supplied to an A/D converter 505 to be converted into respective digital signals which are in turn applied to an intake air temperature TA value register 506, an absolute pressure PBA value register 507 and an engine cooling water temperature TW value register 508, respectively. The values stored in the above registers 506, 507 and 508 and the count in the aforementioned NE value register 503 are supplied to a basic Ti value calculating circuit 510. The values stored in the TW value register 508 and the NE value register 503 and an on-off state-indicative signal of the starting switch 17 are supplied to a start Ti value calculating circuit 511 and a start determining-/after-start fuel increment calculating circuit 512. The start determining/after-start fuel increment calculating circuit 512 has a start determining section 512' (FIG. 9) which is adapted to determine fulfillment of the starting condition of the engine previously described with reference to FIG. 5. If the fulfillment of the starting condition of the engine has been determined, the start determining section 512' generates a binary output of 1 at its output terminal forming one of the two output terminals of the circuit 512, which is inputted to an AND circuit 513. The same output of 1 is inverted into a low level of 0 by an inverter 514, which is applied to one input terminal of an AND circuit 515. On this occasion, the AND circuit 513 is supplied at its other input terminal with a data signal indicative of start Ti values for the main injectors and the subinjector, outputted from the start Ti value calculating circuit 511, so that the data signal is supplied to a Ti value register 517 through the AND circuit 513 and an OR circuit 516. A Ti value control circuit 518, which is connected to the output of the Ti value register 517, arithmetically calculates the valve opening periods TOUTM and TOUTS on the basis of the values of the data signal inputted thereto, using the aforementioned equations (1) and (2). The resulting drive signals corresponding to the calculated valve opening periods are applied to the injectors 6. Incidentally, in FIG. 8, the circuits for control of the main injectors and those for control of the subinjector are illustrated in a combined form for the sake of simplification. On the other hand, a data signal indicative of basic Ti values for the main injectors and the subinjector is supplied from the basic Ti value calculating circuit 510 and applied to one input terminal 519a of a multiplier 519 which has its other input terminal 519b supplied with a value of the after-start fuel increasing coefficient KAST from the output terminal of an after-start fuel increment calculating section 512" of the start determining/after-start fuel increment calculating circuit 512, which forms one of the two output terminals of the latter. At the multiplier 519, the basic Ti value is multiplied by the value of the after-start fuel increasing coefficient KAST, and the resultant product value Ti is outputted from the multiplier 519 through its output terminal 519c and applied to the other input terminal of the AND circuit 515. Since the AND circuit 515 has its other input terminal supplied with the output of 0 through the inverter 514 on this occasion, as previously noted, the AND circuit 515 prohibits the above product value Ti from being applied to the Ti value register 517 through the OR circuit 516. That is, only the aforementioned start Ti value is applied to the Ti value register 517. When the start determining section 512' determines that the starting condition of the engine has finished, it generates an output of 0, which is applied to the AND circuit 513 and also to the inverter 514 which inverts the same output into a high level of 1 and applies it to the AND circuit 515 so that the Ti value register 517 is supplied with the aforementioned product value Ti from the multiplier 519. The Ti value control circuit 518 performs an arithmetic calculation of the valve opening periods TOUTM and TOUTS on the basis of the product value Ti inputted thereto, using the aforementioned equations (3) and (4), to apply drive signals corresponding to the calculated values TOUTM and TOUTS to the injectors 6.

Referring to FIG. 9 illustrating details of the start determining section 512' of the start determining/after-start fuel increment calculating circuit 512, a comparator 520 is supplied at its input terminal 520a with an output value NE corresponding to actual engine rpm Ne, as an input $A_1$, which is outputted from the engine rpm NE value register 503. The value NE is proportional to the reciprocal of the value Ne, that is, the former decreases as the latter increases. The comparator 520 is supplied at its other input terminal 520b with a predetermined value NECRK corresponding to the start determining engine rpm NCR as an input $B_1$ for comparison, which is, outputted from an NECRK value memory 521. When the input relationship of $A_1 \geq B_1$ stands, that is, actual engine rpm Ne is equal to or smaller than the start determining engine rpm NCR, the comparator 520 generates a binary output of 1 through its output terminal 520c and applies it to one input terminal of an AND circuit 522. The AND circuit 522 is arranged to be supplied at its other input terminal with a binary signal of 1 which is generated by the starting switch 17 of the engine 1 when it is in its closed position. When the two inputs to the AND circuit 522 are both 1, an engine start-indicative signal of 1 is outputted from the AND circuit 522, which is delivered to the AND circuit 513 in FIG. 8 directly, and to the AND circuit 515 by way of the inverter 514. The same output signal of 1 is also supplied to the after-start fuel increment calculating section 512″, shown in FIG. 10, of the start determining/after-start fuel increment calculating circuit 512.

FIG. 10 illustrates details of the after-start fuel increment calculating section 512″ of the circuit 512. The engine start-indicative signal referred to above is applied to each one input terminal of AND circuits 523 and 524 directly, and also to a first input terminal 526a of an AND circuit 526 and one input terminal of an AND circuit 527, both by way of an inverter 525. The AND circuit 523 is arranged to be supplied at its other input terminal with a clock pulse CP1 which is generated by the sequential clock generator 502 in FIG. 8. The AND circuit 523 has its output terminal connected to a KAST value register 529 by way of an OR circuit 528. The AND circuit 524 has another input terminal connected to the output terminal of a KAST0 value memory 530. Thus, an initial value KAST0 of the after-start fuel increasing coefficient KAST stored in the KAST0 memory 530 is supplied to the input terminal of the KAST value register 529 through the AND circuit 524 and the OR circuit 531. The AND circuit 526 has a second input terminal 526b connected to an output terminal 532c of a comparator 532 so that when supplied with inputs of 1 at both of its input terminals 526a and 526b, it generates a binary output of 1 each time a clock pulse CP1 is applied thereto at its third input terminal 526c, which binary output of 1 is applied to the KAST value register 529 through the OR circuit 528. The output signal of the engine cooling water temperature TW value register 508 in FIG. 8 is loaded into an address register 533 which in turn selects an address corresponding to the value of the output signal of the register 508 each time a clock pulse CP0 is applied thereto, and the selected address is applied to the KAST0 value memory 530 which outputs a value of the after-start fuel increasing coefficient KAST0 corresponding to the above selected address. The KAST value register 529 has its output connected to an input terminal 534a of an adder 534, as well as an input terminal 532b of the comparator 532 and an input terminal of an AND circuit 540. The adder 534 has its other input terminal 534b connected to an attenuation coefficient memory 536 in which the two's complement of 1/NASTR is stored, and its output terminal 534c to a KAST value auxiliary register 537, respectively. The KAST value auxiliary register 537 has its output connected to the other input terminal of the AND circuit 527 which in turn is connected at its output to the input of the KAST value register 529 by way of the OR circuit 531. Thus, the KAST value register 529, the adder 534, the KAST value auxiliary register 537, the AND circuit 527, and the OR circuit 531 are arranged in the mentioned order and connected to each other to form a closed circuit. A 1.0 constant memory 538 is connected to an input terminal 532a of the comparator 532 and an input terminal of an AND circuit 539. The comparator 532 has an output terminal 532d connected to the other input terminal of the AND circuit 532 directly, and to the other input terminal of the AND circuit 540 by way of an inverter 541, respectively. The AND circuits 539 and 540 have their outputs connected to the input terminal 519b of the multiplier 519 in FIG. 8 by way of an OR circuit 542.

The after-start fuel increment calculating circuit arranged as above operates as follows: When the start determining circuit in FIG. 9 generates a signal having a high level of 1 which is indicative of the engine being in a starting state, this signal is applied to the AND circuits 523 and 524. Then, the AND circuit 523 applies an output pulse to the KAST value register 529 as a set pulse each time a clock pulse CP1 is applied thereto. The KAST value register 529 is supplied at its data input terminal with an initial value KAST0 of the fuel increasing coefficient KAST from the KAST0 value memory 530 through the AND circuit 524 which is then opened, and the OR circuit 531. Each time a clock pulse CP0 is applied to the address register 533, a new initial value KAST0 is outputted from the memory 530. Thus, upon application of each clock pulse CP1 to the KAST value register 529, a new initial value KAST0 is loaded into the register 529. When the engine gets out of its starting state, the level of the start determining signal which has so far been 1 is inverted into 0, which is then applied to the AND circuit 524 to interrupt supply of a further initial value KAST0 to the KAST value register 529 from the KAST0 value memory 530. Therefore, after this, the KAST value register 529 stores an initial value KAST0 corresponding to an engine cooling water temperature value TW available immediately before the termination of the starting state of the engine. This initial value KAST0 is applied to the AND circuit 540 and the input terminal 532b of the comparator 532. Since usually the initial value KAST0 is larger than 1, the relationship between the input value $A_2$ equal to 1.0 applied to the input terminal 532a of the comparator 532 and the input value $B_2$, i.e. KAST0 applied to the input terminal 532b is different from that of $A_2 > B_2$. Therefore, the comparator 532 generates a binary output of 0 through its output terminal 532d, which is applied to the AND circuit 539 directly, and inverted into 1 by the inverter 541 and then delivered to the AND circuit 540. The AND circuit 540 thus opened allows the value KAST0 supplied from the KAST value register 529 to be supplied to the multiplier 519 in FIG. 8 through the OR circuit 542. On the other hand, the value KAST0 stored in the KAST value register 529 is supplied as an input X to the input terminal 534a of the adder 534 which is also supplied at its other input terminal 534b with the value of the two's complement of the attenuation coefficient 1/NASTR stored in the memory 536, as an input Y. An addition of X and Y is carried out by the adder 534, which is substantially equal to a subtraction of 1/NASTR from KAST0. The resultant sum of X+Y is outputted from the adder 534 through its output terminal 534c and stored into the KAST value auxiliary register 537. The new value thus stored in the KAST value auxiliary register 537 is applied to the AND circuit 527 each time a clock pulse CP0 is applied to the auxiliary register 537. The AND circuit 527 is then also supplied with the binary output of 1 which has been inverted by the inverter 525, and therefore is opened to allow the value of X+Y stored in the KAST value auxiliary register 537 to be supplied to the KAST value register 529 through the OR circuit 531, and loaded into the same register 529 for replacement with the old value stored therein, upon application of an immediately following clock pulse CP1 thereto. Again, the value thus stored in the KAST value register 529 is supplied to the AND circuit 540 and the adder 534. So long as the KAST value is judged to be larger than 1 at the comparator 532, the AND circuit 540 remains opened to allow the above KAST value to be applied to the multiplier 519 in FIG. 8 through the OR circuit 542. At the same time, the aforementioned operation of adding the KAST value and the attenuation coefficient is carried out by the adder 534 to cause the resultant new KAST value to be loaded into the KAST value auxiliary register 537 and then into the KAST value register 529. So long as the KAST value, which is reduced by 1 upon application of each TDC signal pulse to the ECU as previously noted, is larger than 1, that is, the input $B_2$ or the KAST value applied to the input terminal 532b is larger than the input $A_2$ having a value of 1.0 applied to the input terminal 532a, the comparator 532 continuously generates a binary output of 1 at its output terminal 532c and applies it to the second input terminal 526b of the AND circuit 526. As previously noted, the AND circuit 526 is then supplied at its first input terminal 526a with the output of 0 of the inverter 525 which inverts the level of the start determining signal, and accordingly applies an output of 1 as a set pulse to the KAST value register 529 through the OR circuit 528 each time a clock pulse CP1 is applied to the third input terminal 526c of the AND circuit 526, to cause replacement of the old KAST value stored in the KAST value register 529 with a new KAST value which has been applied thereto upon application of a clock pulse CP0 immediately preceding the above clock pulse CP1.

When the KAST value becomes equal to or smaller than 1.0 after repeated adding actions of the adder 534 so that the input relationship of $A_2(=1.0) > B_2(=KAST)$ stands at the comparator 532, the comparator 532 generates a binary output of 0 through its output terminal 532c and applies it to the second input terminal of the AND circuit 526 to close same. Thus, after this, no further replacement of a new value with an old value takes place in the KAST value register 529, to keep the value stored in the register 529 constant.

On this occasion, the comparator 532 generates a binary output of 1 through its output terminal 532d and applies it to the AND circuit 539 directly, and the same output of 1 is inverted into a low level of 0 by the inverter 541 and applied to the AND circuit 540. The AND circuit 540 thus closed then prohibits supply of the KAST value stored in the KAST value register 529 to the OR circuit 542, while simultaneously the AND circuit 539, which is then opened, allows supply of the constant value of 1.0 stored in the 1.0 constant memory 538 to the OR circuit 542 as a value of the coefficient KAST. Thus, the above constant value of 1.0 is supplied to the multiplier 519 in FIG. 8 at its input terminal 519b. After this, the start determining/after-start fuel increment calculating circuit 512 continues to supply the above constant value of 1.0 to the multiplier 519, that is, the after-start fuel quantity increasing action has been terminated.

What is claimed is:

1. An electronic fuel injection control system employing digital processing circuitry for electronically controlling the quantity of fuel being supplied to an internal combustion engine which is equipped with a starter, a starting switch and a direct current voltage power source connected to said starter by way of said starting switch, said system comprising: a first sensor for sensing the rotational speed of said engine; a second sensor for sensing the temperature of said engine to supply an output signal representative of the engine temperature; analog-to-digital converter means for converting at least said output signal from said second sensor into a corresponding digital signal; means for generating a pulse signal in synchronism with rotation of said engine; means adapted to generate a signal indicative of said engine being in a starting state, when said starting switch is in a closed position thereof and a value of the rotational speed of said engine sensed by said first sensor is lower than a predetermined value corresponding to a cranking speed of said engine; means for increasing the quantity of fuel being supplied to said engine upon and after termination of generation of said engine start-indicative signal, said fuel increasing means being adapted to calculate an initial value of fuel increment applicable upon and after termination of generation of said engine start-indicative signal as a function of a value of said corresponding digital signal from said analog-to-digital converter means, solely one time, and gradually decrease said initial value thus calculated, in synchronism with generation of said pulse signal, at least said fuel increasing means and said analog-to-digital converter means being arranged to have operating voltage thereof supplied from said direct current voltage power source.

2. The electronic fuel injection control system as claimed in claim 1, wherein said initial value of fuel increment is decreased by a predetermined amount upon generation of each pulse of said pulse signal.

3. The electronic fuel injection control system as claimed in claim 1, wherein said direct current voltage power source comprises a battery.

4. The electronic fuel injection control system as claimed in claim 1, 2 or 3 including means for arithmetically calculating a basic value of the quantity of fuel being supplied to said engine as a function of a plurality of parameters representative of the operating condition of said engine and including the rotational speed of said engine and pressure in an intake pipe of said engine, and wherein said fuel increasing means is adapted to arithmetically calculate an initial value of a fuel increasing coefficient indicative of said fuel increment as a function of said value of the temperature of said engine sensed by said second sensor, and correct said basic value by said fuel increasing coefficient.

* * * * *